Oct. 5, 1926.

A. J. WEST 1,602,089

INTERNAL COMBUSTION ENGINE

Original Filed Nov. 9, 1920    7 Sheets-Sheet 1

INVENTOR
Arthur Jackson West.
a. B. Reavis
ATTORNEY

Oct. 5, 1926.

A. J. WEST 1,602,089

INTERNAL COMBUSTION ENGINE

Original Filed Nov. 9, 1920  7 Sheets-Sheet 2

INVENTOR
Arthur Jackson West

A. B. Reavis
ATTORNEY

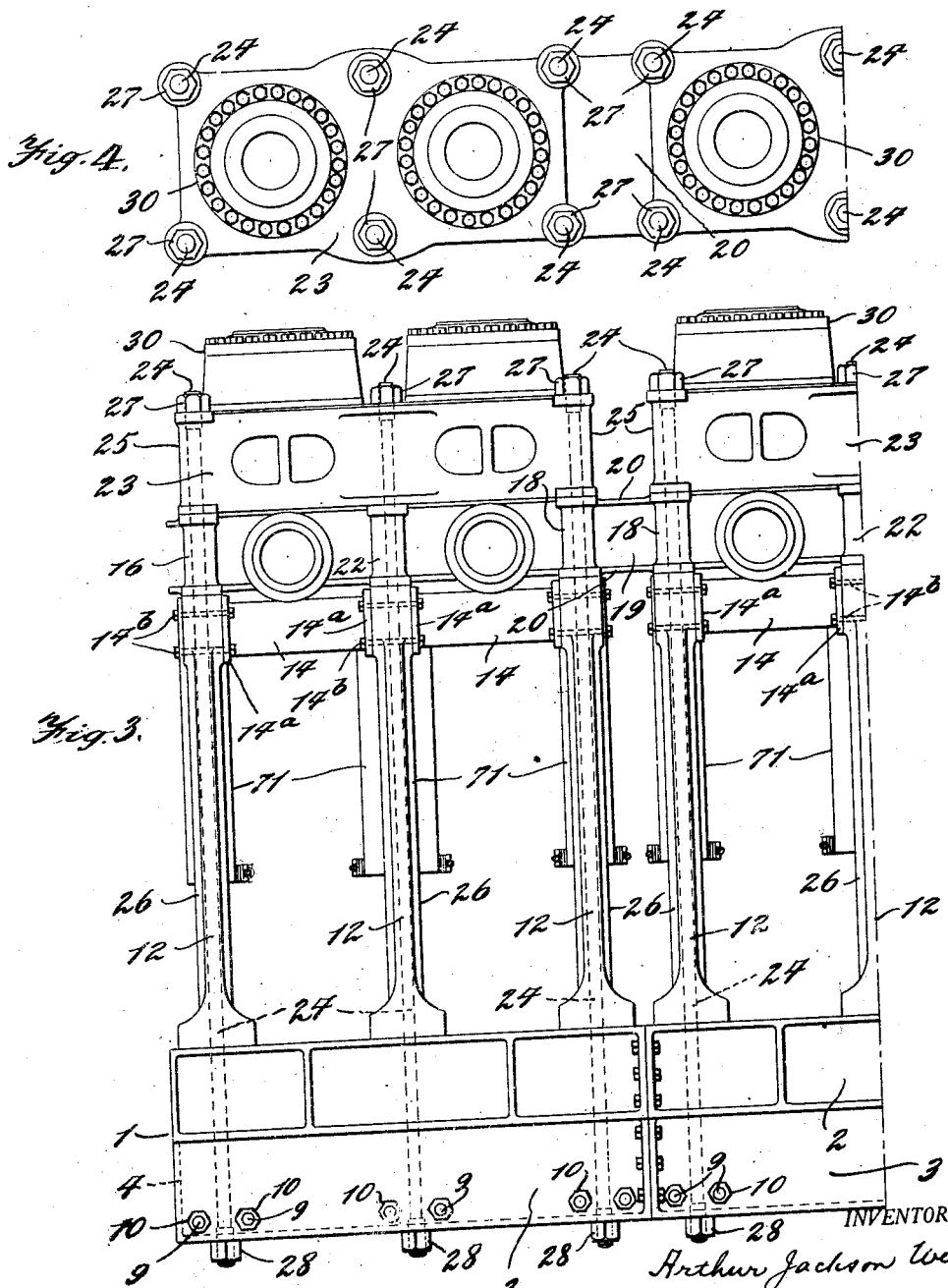

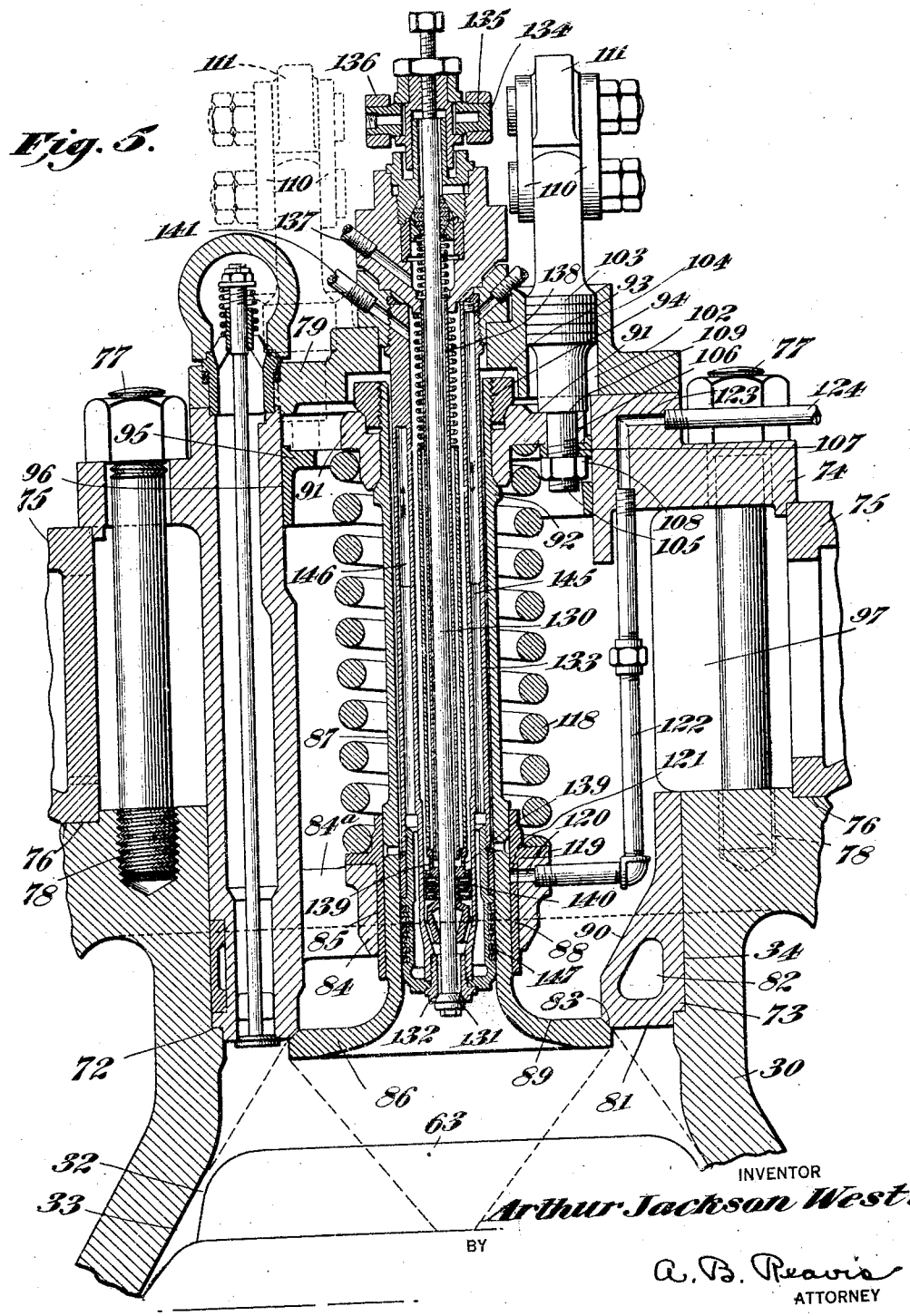

Oct. 5, 1926.　　　　　　　　　　　　　　　　1,602,089
A. J. WEST
INTERNAL COMBUSTION ENGINE
Original Filed Nov. 9, 1920　　7 Sheets-Sheet 5
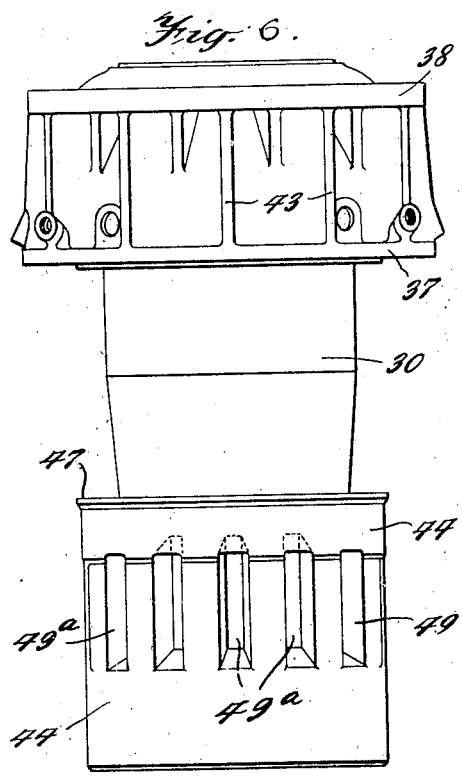
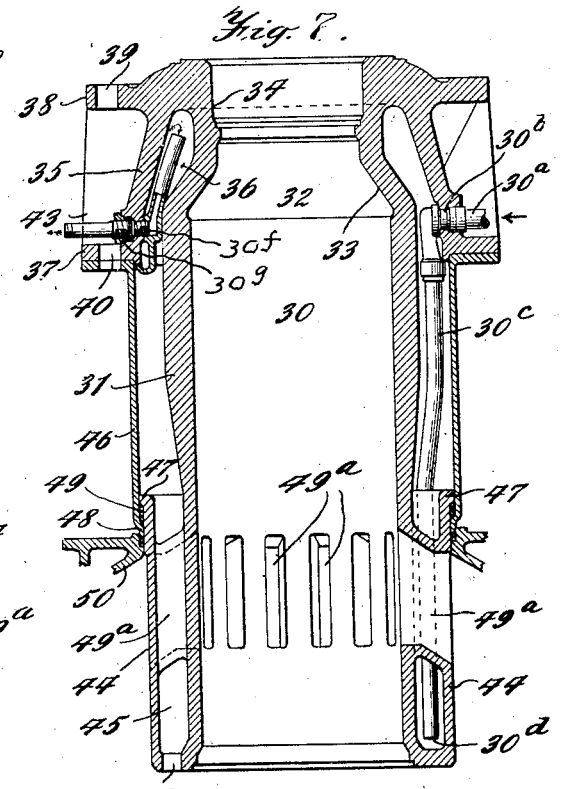
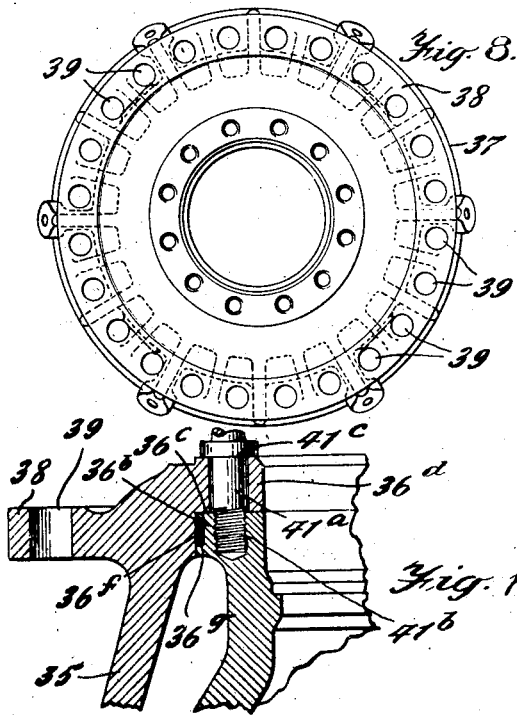
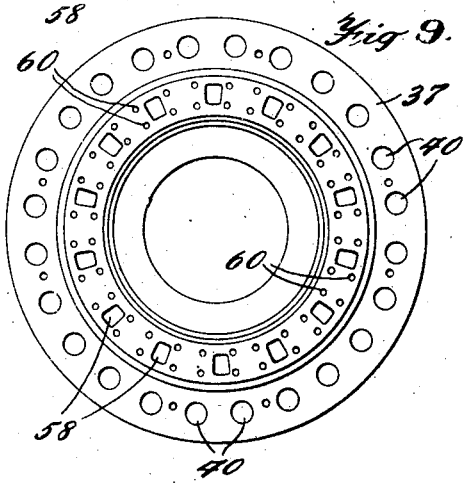
INVENTOR.
Arthur Jackson West
BY
Gifford and Bull
His ATTORNEYS

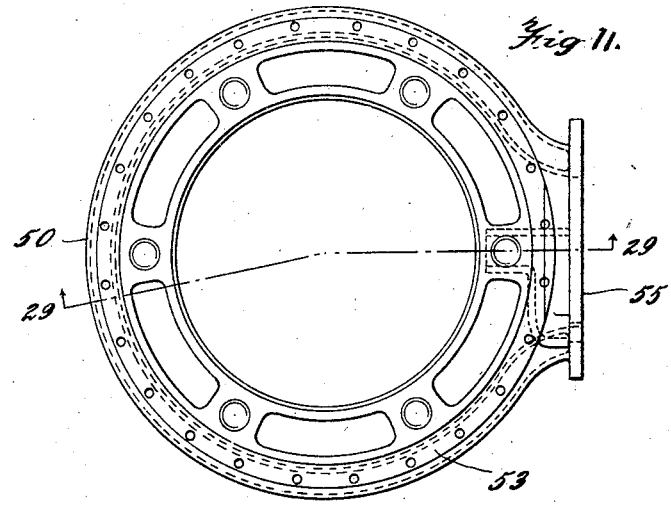
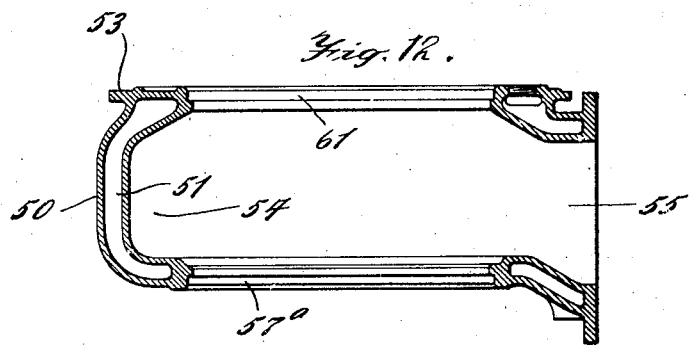
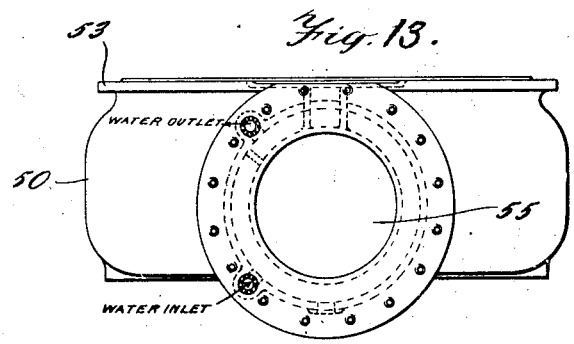

Oct. 5, 1926.
A. J. WEST
1,602,089
INTERNAL COMBUSTION ENGINE
Original Filed Nov. 9, 1920   7 Sheets-Sheet 7
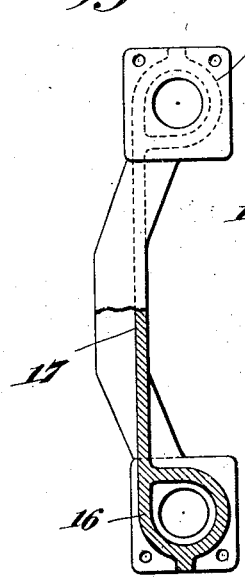
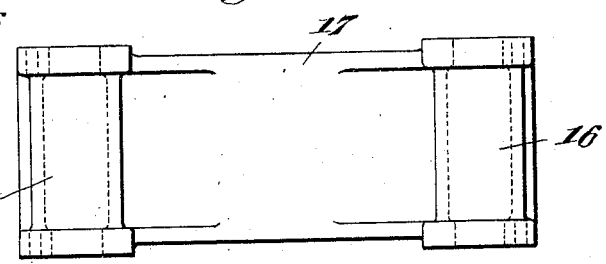
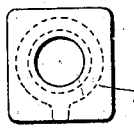
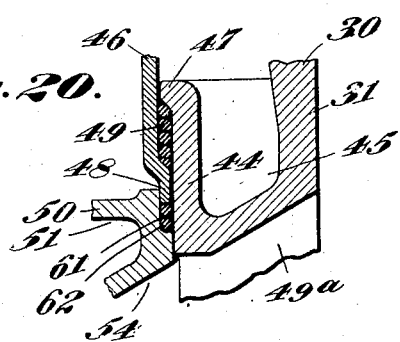
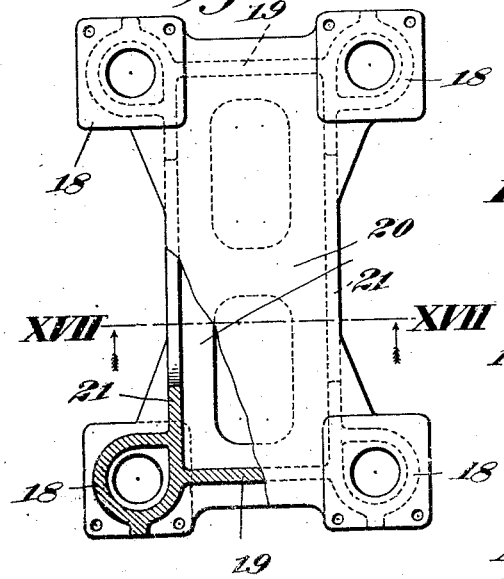
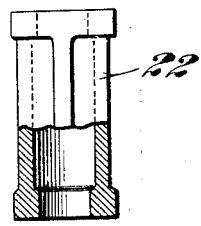
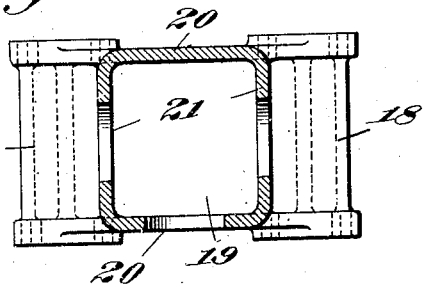
INVENTOR
Arthur Jackson West.
BY
A. B. Reavis
ATTORNEY Patented Oct. 5, 1926.

UNITED STATES PATENT OFFICE.

ARTHUR JACKSON WEST, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

INTERNAL-COMBUSTION ENGINE.

Application filed November 9, 1920, Serial No. 422,753. Renewed December 29, 1925.

My invention relates broadly and generally to new and useful improvements in internal combustion engines, and more particularly to that type wherein fuel for combustion is injected into working cylinder and ignited by heat in the cylinder, for example, that heat resulting from compression of a gaseous component of combustion in the cylinder, although it will be understood that in its broad aspect the invention embodies many features applicable to all types of internal combustion engines.

Engines of the general type mentioned in existence prior to my present invention, so far as I am aware, have been objectionable from a commercial standpoint because of certain inherent structural defects and limitations which my present invention obviates. Among such defects and limitations are the following: In 4-stroke-cycle engines operating on said principle, the weight of the engine, and the space occupied by it, are necessarily objectionably large, due to the fact that each cylinder makes only one power stroke in four, and consequently the weight per horse-power developed is unduly large and out of proportion to any supposed advantages gained by the use of such an engine. In order to overcome this difficulty numerous attempts have been made to construct engines operating on said principle so as to function on a 2-stroke cycle, but these too have not proved commercially available, especially when designed to produce large horse-powers at comparatively slow speeds, for example, an engine such as might be required to furnish power in a large power plant, or to drive ships of considerable size. These prior 2-stroke cycle engines have been only partially successful, due to the fact that the heat effects in the power cylinder and adjacent parts, resulting from the explosion of the combustible charge, were not properly controlled, thus resulting in cracking and destruction of such cylinders and parts, which of course, means the incapacitating of the engine for any useful purpose. This has been due to the fact that in large engines working at comparatively slow speeds, the cylinder, or cylinders, is necessarily of considerable length, requiring the admission of scavenging air at the top or that end of the cylinder opposite the exhaust ports, in order to provide for complete scavenging, and in engines of this type the cylinder, cylinder heads and other parts exposed to the highest heat effects have been necessarily so constructed that deterioration and failure of the metal of the cylinder and parts has resulted usually from such heat effects, which could not be efficiently controlled or prevented, so that the life of the cylinder and heated parts has been shortened to such an extent as to prevent commercial success of such engines.

Another inherent objection has been that efficient means have not been provided for controlling or preventing deleterious heat effects resulting from the wide differences of temperature between that portion of the cylinder which is exposed to the greatest heat, and that external portion which is in contact with the cooling medium for the cylinder. These large differences in temperature have resulted in differences in the extent of expansion and contraction between the inner and outer portions of the cylinder wall, thereby resulting in internal stresses in the cylinder wall, causing deterioration of the metal and cracking of the cylinder. These prior constructions have also been objectionable and have failed because of inadequate provision for protecting or relieving the cylinder wall of stresses due to the forces resulting from the explosion, or from expansion and contraction of the cylinder under heat effects. Furthermore, it has been impossible to keep the temperature of all portions of the cylinders or other heated parts sufficiently near to the average temperature of the whole cylinder or heated parts to prevent deterioration and consequent failure of an overheated portion, due to the unequal heat effects in the local area which fails, in other words to prevent the possibility of certain areas becoming heated to such an extent in excess of the average temperature of the cylinder as to result in hot spots.

One object of my invention, among others, to be more fully described hereinafter, is to provide an engine commercially available for the generation of large horse-powers at comparatively slow speeds, in which the objections above set forth will be obviated, and in which the heat effects may be efficiently controlled within the limits of safety in such an engine necessary to its commercial success. Other objects will appear in the following detail description of the invention.

The invention consists in the improved construction and combinations to be more fully described hereinafter, and the novelty of which will be particularly pointed out and distinctly claimed.

I have fully and clearly illustrated my invention in the accompanying drawings to be taken as a part of this specification, and wherein—

Fig. 3 is a side elevation of a section of my improved engine with the valve mechanisms removed;

Fig. 4 is a plan view of the apparatus shown in Fig. 3;

Fig. 5 is a fragmentary sectional view showing my improved scavenge and fuel injection valve mechanisms;

Fig. 6 is an elevational view of one of my improved engine cylinders;

Fig. 7 is a sectional view of one of my improved engine cylinders;

Fig. 8 is a plan view viewed from the top of the cylinder shown in Figs. 6 and 7;

Fig. 9 is a plan view viewed from the bottom of Figs. 6 and 7;

Fig. 10 is a fragmentary sectional view showing a modified type of cylinder construction;

Fig. 11 is a detail plan view of the exhaust collector;

Fig. 12 is a sectional view taken along the line XII—XII of Fig. 11 viewed in the direction of the arrows;

Fig. 13 is an elevational view of the exhaust collector;

Figs. 14 and 15 are detail views showing pedestal members for the ends of the engine;

Figs. 16 and 17 are detail views of pedestal constructions for adjacent two-cylinder engine structures;

Figs. 18 and 19 are detail views of intermediate pedestal members;

Fig. 20 is a detail sectional view showing packing for interfitting jacket and exhaust collector portions.

Figure 1:
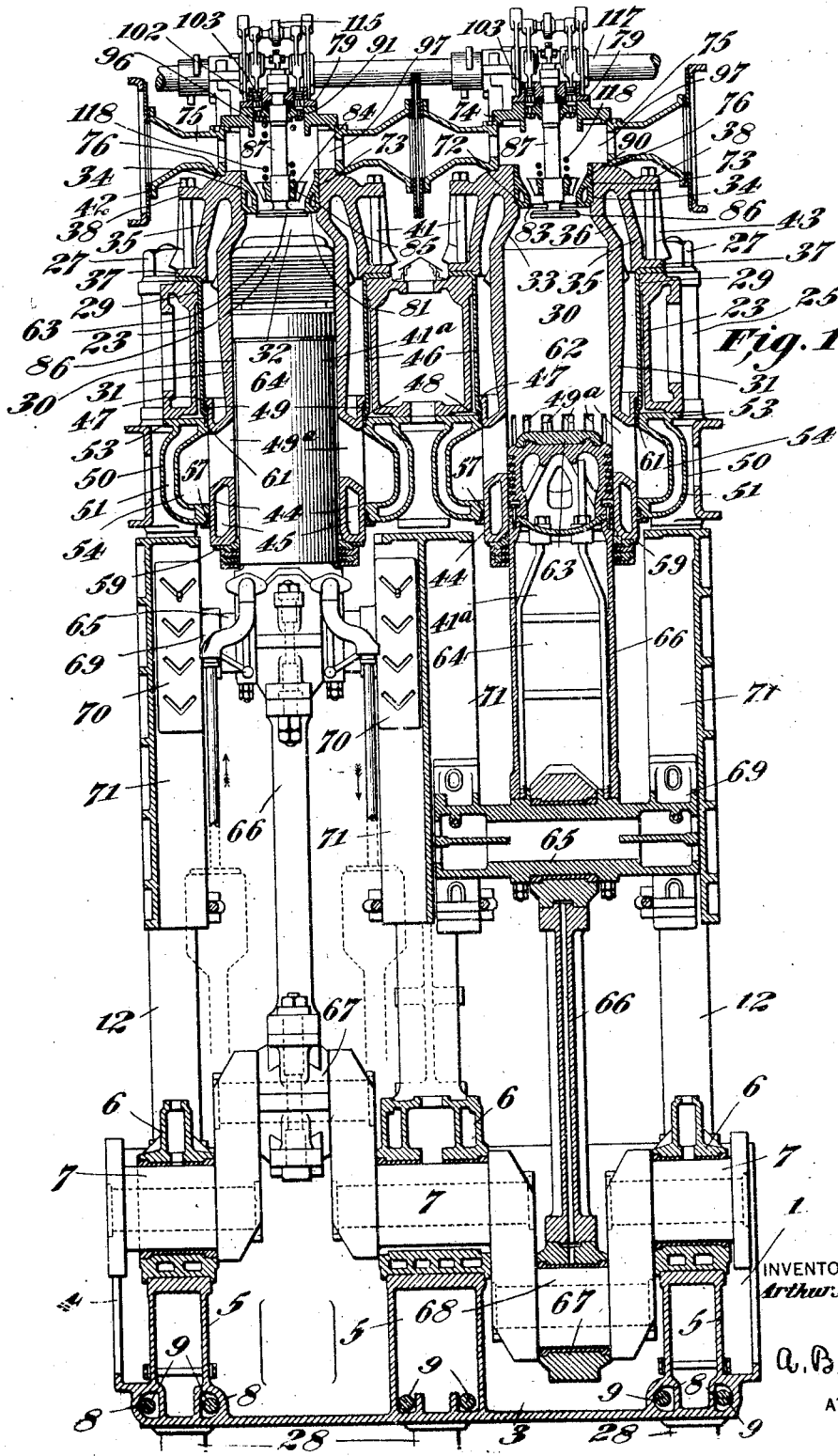
Fig. 1 is a longitudinal vertical sectional view of a portion of an engine made in accordance with my invention.

Referring to the drawings by characters of reference, 1 designates generally the bed of the engine, the same being preferably cast in an integral structure for each pair of cylinders as a support for the engine frame, and also with bearings for the crank shaft. This bed consists preferably of longitudinal flanged side members 2, 2 (see Fig. 2), a trough member 3, and end members or walls 4, said members 2, 3 and 4 constituting a casing for the crank shaft of the engine. Within the crank casing and integral with the walls of the latter, are transverse supports 5 (see Fig. 1) for the bearings 6 for the crank shaft 7. The crank casing is provided with transverse housings 8 (see Figs. 1 and 2) receiving transverse tension members, preferably in the form of bolts 9, extending through said housings, said bolts being each provided on its ends outside of the casing and abutting the opposite sides of the latter with nuts 10, 11, by means of which nuts the members 9 may be placed under tension, opposing the forces to which the crank casing may be subjected, due to the operation of the engine tending to rupture the crank casing. These bolts 9 are adjusted to an initial tension in excess of any tension to which that part of the crank case is subjected, so that the crank casing is relieved of transverse disrupting tension. The side members 2 of the crank case or bed of the engine are adapted to rest upon any suitable foundation (not shown), and to sustain the weight of the engine in such manner that the trough 3 of the crank case is not directly supported by the foundation.

Supported on the bed just described, are the side frames or standards 12, 13, arranged in groups of three pairs, each of which groups supports two power cylinders. At their upper ends the pairs of each group are connected and rigidly braced by means of horizontal girders 14, arranged between the frames, and having flanges 14ª secured thereto, in any suitable manner, for example, bolts 14ᵇ. The pairs of frames at the extreme ends of the engine frame structure each support a pair of vertical, hollow pedestals 16, connected by transverse, vertical webs 17, while the pairs of frames at the adjacent ends of said groups support pedestals 18, the pedestals on the frames of one group being connected to the pedestals of the adjacent group by vertical webs 19 and upper and lower horizontal webs or flanges 20, (see Figs. 16 and 17), and said pedestals being further braced by transverse, vertical webs 21, said pedestals and webs being preferably cast in a rigid, integral structure, as shown in Figs. 16, 17. The connectors formed by the pedestals 18 and their connecting webs constitute a lateral and transverse brace between adjacent groups of said frames. Between the pedestals 16 and 18, just described, are intermediate hollow pedestals or columns 22.

Upon the upper ends of the pedestals 16, 18 and 22 on each group of frames is supported a cylinder support 23, the same being shown in plan view in Fig. 4, and in elevation in Fig. 3, said cylinder supports and pedestals being connected to the engine frames by vertically extending tie-members or tension-members 24 extending through sleeves or hollow columns 25 formed in the cylinder support, sleeves 26 on the side frames 12 and 13 and through the bottom of the crank case 3. The tension-members 24 carry nuts 27, 28 threaded, respectively, on the lower and upper ends thereof and abutting the upper surfaces of the members 23 and the bottom of the crank case, said nuts being operable to place said rods under tension, thus rigidly securing together the intervening parts. It will be seen that the pedestals 16, 18 and 22 constitute spacers between the upper ends of the standards 12, 13 and the cylinder supports 23. The members 24 are placed under initial tension greater than the working stress due to the operation of the engine, thus relieving the intervening parts from all tension stresses. The members 23 are each provided with two circular spaces 29 therethrough, in each of which spaces is located one of the working cylinders 30 of the engine. These cylinders are of a novel construction which will now be described:

Each cylinder (see particularly Figs. 6 and 7) consists of an annular wall 31 of such length and diameter as the power output of the engine may require. At its upper portion the inner cylindrical wall of the engine cylinder is merged into a tapered or contracted portion 32 having a downwardly flaring surface 33 terminating at the upper extremity of the cylindrical bore, said tapered surface performing a function to be presently described, and forming part of the combustion space of the cylinder. From the contracted portion 32 the shell of the cylinder is extended upwards, as at 34, where at its upper end portion it connects with an overhanging wall or jacket member 35 extending downward to a point preferably below the point at which the cylindrical bore of the cylinder merges with the contracted portion 32, said overhanging wall 35 being spaced from the cylinder wall proper in order to provide a space 36 for the circulation of a suitable cooling medium such as water. In the construction, the annular overhanging wall 35 is not connected to the cylinder wall proper at any point, except at the extreme upper end, thereby providing an unobstructed annular space between the cylinder wall or jacket member and said overhanging wall for the circulation of the cooling medium, and to allow expansion and contraction of said walls independently of each other. While I have, in the preferred construction, shown the overhanging wall or jacket member cast integral with the upper end of the cylinder structure, I may if desired, make said wall or jacket member in a separate casting and bolt the same to the cylinder head, as shown in Fig. 10. The lower edge of each of the overhanging walls 35 is provided with an outwardly extending circumferential flange 37 resting upon the member 23, whereby the cylinder is supported on the member 23 by said overhanging wall or jacket member, and the main body portion of the cylinder is free to expand and contract longitudinally from its extreme upper end to its extreme lower end. The wall 35 is also provided with an upper flange 38 having openings 39, through which, and openings 40 in the said flange 37, extend securing studs or bolts 41, the lower ends of which are threaded into the said member 23, and the upper ends of which are provided with heads 42 which engage the upper face of flange 38, whereby the upper end of the cylinder 30 is rigidly connected to the cylinder support 23. It will be seen that by this arrangement the cylinder wall is free to expand lengthwise toward the crank shaft without regard to the support on or connection to the member 23. It will be seen that my improved engine cylinder is substantially bottle-shaped in outline, that is, it has a cylinder portion 30 defining the piston bore and a flaring or contracted portion 32 which merges into the contracted or neck portion 34, the latter portion being connected to the overhanging supporting wall or jacket member 35.

In Fig. 10 the upper end of the cylinder proper is provided with an annular lateral flange $36^b$ received in an annular recess $36^c$ beneath an inwardly directed annular flange $36^d$ formed integral with the part 35, the cylinder being secured to said part 35 by means of stud bolts $41^a$ corresponding to the valve cage holding and clamping studs hereinafter mentioned, and passing through openings in the flange $36^d$, and threaded, as at $41^b$, into the flange $36^b$, said bolts each having a fixed shoulder $41^c$ integral therewith, and engaging the top of the flange $36^d$, whereby the parts are clamped together. Suitable fluid-tight packing $36^e$ may be interposed between a shoulder $36^g$ on the outer face of the flange $36^b$ and the bottom of the recess $36^c$. The upper and lower flanges 37, 38 are connected by integral ribs 43, preferably also integral with the member 35.

The cylinder walls are relieved from longitudinal strains by the following structure, which, as a longitudinal strain opposing structure, I believe to be new. Surrounding that portion of the cylinder containing the initial combustion space where the highest pressure and temperature occurs, is what I may term a circular or annular truss construction, consisting of overhanging wall 35 the flanges 37, 38, the ribs 43 and the bolts or studs 41. The flanges and ribs are preferably, although not necessarily, integral with the cylinder, but may be cast separately therefrom. The bolts or studs 41 preferably extend only from flange 38 to and through flange 37, and are preferably in circular arrangement. This truss structure extends above, and preferably below the top of the combustion space of the cylinder, as shown, and forms a support for the cylinder which is rigid against explosion stresses, but permits free expansion and contraction of the cylinder resulting from changes in temperature.

The water jacket wall 35 extends from its junction with the cylinder above the top of the combustion chamber downward to a point below the top of the piston stroke. It thus encloses the initial combustion occurring within the tapered portion of the cylinder. This construction possesses the advantages that the connection of the water jacket with the cylinder is removed from the locality of the greatest heat, and the tapered wall of the cylinder, the water cooling outside thereof and the air cooling inside thereof, as hereinafter described, all contribute to most favorable temperature conditions. The cylinder wall proper is of greater thickness at the upper or explosion end, the thickness decreasing gradually toward the exhaust end. This reduction in thickness is permissible, due to the decrease in pressure between the upper end of the cylinder and the piston as the latter descends, and is advantageous in increasing the cooling effect, and decreasing the weight of the cylinder. The lower end of the cylinder is provided with an upwardly directed wall or jacket member 44 spaced from the main cylinder wall and forming an annular space 45 for the circulating of cooling medium. The upper end of said wall or jacket member 44 terminates a distance from the lower edge of the wall 35, the space between the same being bridged or closed by a cylindrical jacket member 46 rigidly supported on the member 23 in the space between the latter and the main cylinder wall 31, the jacket 46 being spaced from the main cylinder wall, and together with the walls or jacket members 35 and 44 forming an annular cooling space for the circulation of cooling medium. It will be noted that this cooling space extends from a point above the contracted space 32 to the extreme lower end of the cylinder. The upper edge of the wall or jacket member 44 is provided with an outwardly directed flange 47 (see Figs. 1, 2 and 5) between which, and an inwardly directed flange 48 on the member 46, is suitable packing 49 to prevent leakage of the cooling medium between the parts, while at the same time allowing movement of the wall or jacket member 44 longitudinally of the member 46 due to expansion and construction of the cylinder under heat effects. A great advantage of having the cooling space extend entirely to the lower end of the cylinder resides in the fact that any sediment, such as mud, salts, etc. which may be deposited from the cooling medium will drop to the lower portion of the annular space 45 and out of the area where it is necessary that cooling medium be present at all times.

The water jacket wall comprises three sections, two of which join the cylinder walls at opposite ends, and the third of which forms a telescopic joint with one of said two, and extends to the other of the two, the two end sections surrounding, respectively, the combustion space above the cylinder stroke and the exhaust openings.

The wall of the water jacket is connected to the cylinder above the combustion space and extends downwardly to enclose the combustion space above the cylinder stroke, being substantially free of the cylinder wall opposite the combustion space. Any suitable means may be provided for circulating a cooling medium, preferably water, in the cooling space surrounding the engine cylinder, said means preferably consisting of an inlet pipe or pipes 30ª sealed in an opening 30ᵇ in the wall 35, and connected to a downwardly directed pipe 30ᶜ, the lower open end of which terminates closely adjacent the bottom end wall of the cylinder cooling space, as at 30ᵈ. The water or other cooling medium circulated in the cooling space rises in the upper portion thereof and flows out through one or more connections 30ᵉ, the upper end of which is located adjacent the point of union between the wall 35 and the part 33, and the lower end of which is connected to and communicates with an outlet coupling 30ᶠ, suitably sealed in an opening 30ᵍ in the wall 35. It will be understood that the cooling medium may flow from any suitable supply and be circulated in any suitable manner. By the arrangement shown, the cooling medium circulates throughout the entire cooling space, and by locating the inlet and outlet, in the manner described, vapor pocketing in the upper end of the cooling space is prevented. It is preferable to locate the couplings for the inlet and outlet connections adjacent the lower end of the part 35 so as not to weaken the truss structure, which would result if connections were made at points higher in said member 35. At the lower end portion of the cylinder are a plurality of radially arranged exhaust ducts 49ª, preferably formed integral with the cylinder wall proper and the upwardly directed wall or jacket member 44. These ducts are preferably cast integral with said walls so that all possibility of leakage of the cooling medium into the exhaust ducts, or of gas into the cooling medium space is effectively prevented, while at the same time the desired flexibility of the cylinder wall is retained. The exhaust ducts 49ᵃ are preferably arranged as a circumferential belt near to the lower or exhaust end of the cylinder so as to divide the cooling space into annular portions arranged above and below the exhaust belt which portions communicate with each other through the spaces between the duct walls. In this way, circulation of cooling fluid may be had to an adequate extent throughout the cooling space and the exhaust end structure of the cylinder may be sufficiently cooled. As shown, the ducts are elongated in the direction of length of the cylinder. This feature affords adequate exhaust area without having ports too wide in a circumferential direction, thereby resulting in the retention of sufficient strength in the material of the cylinder between ducts and also a large ratio of exhaust port wall area to exhaust port cross sectional area in order that adequate cooling surfaces for the exhaust ports may be provided. The exhaust ports are inclined outwardly and downwardly so that the exhaust gases may leave the cylinder with a minimum degree of turning, thereby facilitating the passage of the exhaust gases to the exhaust collecting apparatus to be described. The bridging jacket member 46 engages the lower jacket member externally for the reason that, in practice, the lower end of the cylinder construction, including the jacket member 44 and the ports 49ᵃ, tend to be maintained at higher temperatures than the bridging jacket member 46. Therefore, by having the bridging jacket member arranged as an outer telescoping member, a tight joint is at all times assured and expansion of the outer member away from the inner member avoided. Surrounding each power cylinder at the lower end portion of the latter is an exhaust collector 50 consisting preferably of a water-cooled annulus 51 supported from the lower portion of the cylinder support 23, and secured to the latter by studs or bolts 52 passing through a flange 53 and entering said element 23. Each of these exhaust collector members is provided with an annular exhaust-receiving chamber 54 surrounding the cylinder at that area of the latter at the exit of the exhaust ducts 49ᵃ, previously described. The exhaust from these ducts 49ᵃ passes into the annular chamber 54 and thence through an outlet duct 55 into the exhaust pipe 56. The lower end of the cylinder 30 extends below the lower edge of the exhaust collector and may slide relative to the latter when expanding and contracting due to heat effects. A packing consisting of a stuffing-box 57 (Figs. 1 and 2) is carried by the exhaust collector and engages the lower end of the cylinder to prevent escape of exhaust gases. The web connecting the lower end of the cylinder with the upwardly directed wall or jacket member 44 is provided with a plurality of annularly arranged clean-out openings 58 which are closed by an annular closure plate or ring 59 secured to the lower end of the cylinder by any suitable screws or studs fitting openings 60 (Fig. 9) at the lower end of the cylinder, said openings 58 being located below and in line with the spaces between the exhaust ducts.

The upper end of the exhaust collector is provided with an annular recess 61 which receives the flange 48, and between which flange and the base of the recess is fire-packing 62, for example, asbestos (Fig. 21), which engages the outer surface of the wall 44 and prevents escape of hot gases at this point, said fire-packing also serving to protect the fluid-packing 49, which may be of rubber or other suitable material.

The piston is indicated generally at 41ᵃ (Figs. 1 and 2) and includes a head 63 and a barrel portion 64 constituting a piston guide, the lower end of the said barrel portion being connected to a cross-head 65, which in turn is connected to the upper end of a connecting rod 66; the lower end of which is provided with a bearing-box 67 on the crank pin 68 of the crank shaft 7. The cross-head is provided with end extensions 69 carrying slide members 70 (Fig. 1) which slide on the cross-head guides 71 bolted to the members 12, 13 of the main frame of the engine.

The fuel and air injection valves will now be briefly referred to.

Figure 2:
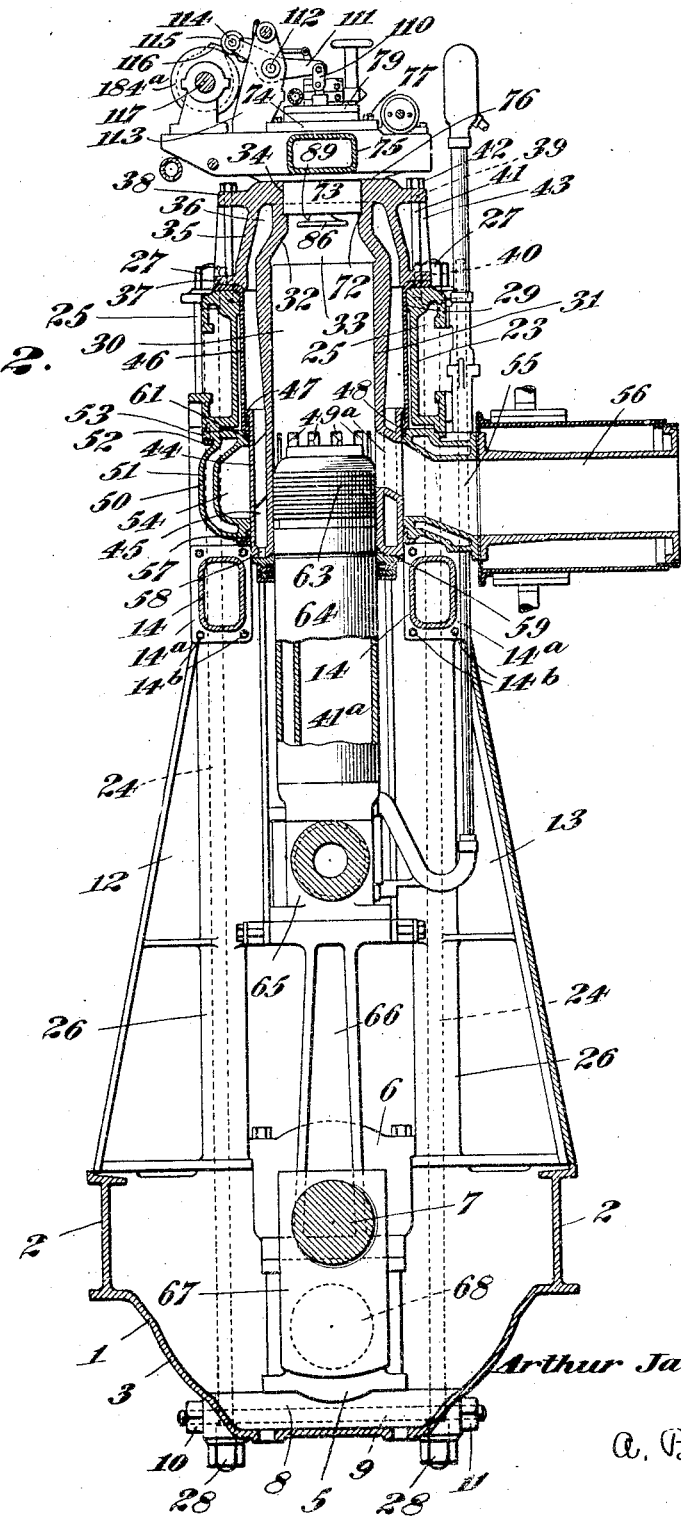
Fig. 2 is a transverse sectional view of my improved engine.

Referring particularly to Figs. 1 and 2 of the drawings, 72 designates an annular shoulder in the upper end of the cylinder wall structure above the tapered portion 33, heretofore described, and seated on this shoulder is an annular valve-supporting member or cage 73, said cage being preferably cylindrical in form, and having at its upper end an outwardly directed flange 74 resting on a chamber 75 which is supported on the upper end of the engine cylinder, as at 76 (Fig. 5), and rigidly secured thereto by bolts or studs 77 passing through said flange and chamber and threaded into the upper end of the cylinder, as at 78, said cage extending downward through said chamber. The shoulder 72 constitutes a joint beyond which the heated gas cannot pass, and that therefore no part of the interior surface of the cylinder wall 33 above this joint can receive heat from the combustion. It is to be noted that the cooling space 36 extends well above the joint 72 so that there is no possibility of a hot spot at this portion of the cylinder. The upper end of the valve cage is closed by a cap-piece 79 secured to the body of the cage, while the lower end of said cage is left open in order to communicate with the upper end of the engine cylinder, such communication being controlled in a manner to be presently described. At its lower end the cage is provided with an inwardly directed flange member 81, preferably cast integral with the body of the cage, said flange providing sufficient metal for a surrounding cooling space 82, and the inner edge 83 constituting a valve seat for an air admission valve, to be presently described. The flange member 81 also provides for certain ducts for air admission for air starting valves, and a safety valve, to be described later.

Within the cage 73 adjacent the lower end thereof, is a bearing member 84 having a circular opening 85 constituting a guide for the stem of a scavenging valve, and supported by arms 84ª connecting the same with the cage. This valve is shown at 86, and is preferably circular in form and arranged concentrically with the cylinder bore to cooperate with the seat 83 to control communication between the interior of the valve cage and the upper end of the engine cylinder. This valve is carried by the lower end of a sleeve stem 87 sliding through the said opening 85, a bearing sleeve 88 surrounding said stem 87, if desired. The stem 87 is preferably integral with the valve, and the two are joined on a downwardly and outwardly flaring face 89 against which air from the cage is directed by a downwardly and inwardly inclined annular face 90 on the said flange 86, thereby cooling the valve.

The parts just described are so proportioned that air flowing inward and striking said face 90 will be deflected upon the face 89 and finally issue in annular expanding form concentric with the cylinder, and which is double cone form in cross-section, as indicated in Fig. 5, against the face 33 of the cylinder and also toward the axis of the cylinder, by which means the valve and the adjacent faces of the cylinder are subjected to the most efficient cooling effects of the entering air, and the cylinder is cleared of burnt gas. At its upper end portion the stem is provided with a cross-head 91 surrounding said stem and held thereon between a flange 92 on the stem and a clamping nut 93 threaded on the upper end of the stem as at 94. This cross-head carries a bearing ring 95 (Fig. 5) which slidably engages the inner surface 96 at the upper end of the valve cage, said ring 95 and the said guide surface 96 serving to properly center the valve stem within the cage, and to guide the stem during its reciprocations. Air is admitted to the interior of the valve cage from the scavenging air supply chamber 75 mounted on the top of each of the cylinders of the engine, and held between the flange 74, heretofore described, and the top of the cylinder by means of the said bolts 77 (Fig. 5). This air chamber 75 communicates with the valve cage through a plurality of ports 97 (see Fig. 5).

In the cap-piece 79 are a pair of guide orifices 102 (Fig. 5), in each of which slides a plunger 103, preferably carrying packing 104 cooperating with the inner bore of the opening 102 to seal the same against leakage of scavenging air. At its lower end each plunger 103 is provided with a threaded extension 105 passing through openings 106 in the said cross-head 91, and an opening 107 in the said ring 95, the lower end of said extension carrying a clamping nut 108 which is operable to clamp the ring 95 against the crosshead 91, and the latter against the shoulder 109 on the said stem 102, whereby the parts are rigidly connected. At its upper end, each of the members 103 is connected by a pair of links 110 to one end of each of the levers 111, the same being fulcrumed at an intermediate point 112 on a bracket 113 secured to the upper wall of the member 75, heretofore described. The opposite ends of the levers 111, from those heretofore described, are connected by a cross-pin 114 carrying a roller 115 which is adapted to be engaged by a cam 116 on a cam carrier 184ª keyed on a shaft 117 driven from the crank shaft and operating said cam to engage the said roller to exert a downward movement on the scavenging valve to open communication between the interior of the valve cage and the power cylinder. The scavenging valve is normally urged toward closed position by means of an expansion spring 118 surrounding the said stem 87, and at its lower end abutting a collar 119 on the sleeve 88, and at its upper end exerting its force against the cross-head 91.

Through the bracket 84 is an opening 120 registering with an opening 121 in the sleeve 88, and connected to said opening 120 is a pipe 122 connecting with a duct 123 in the upper end 74 of the valve cage, which duct is in turn connected by a pipe 124 with a source of lubricating oil supply, by which arrangement proper lubrication is provided for the reciprocating movements of the scavenging valve sleeve.

Briefly my improved fuel injection valve comprises a valve stem 130 slidable axially of the scavenge air valve stem 87, the stem 130 having a conical valve 131 at its lower end cooperating with a valve seat 132 carried by stationary sleeve structure 133 fitting within the stem 87 and suspended from the top of the cage structure. At its upper end, the stem 130 is adjustably connected to suitable operating mechanism including journals 134 fitting in bearings 135 of a lever 136 which is operated from the cam shaft 117. Fuel oil is supplied from an inlet 137 to the annular space between the valve stem 130 and an intermediate sleeve 138, the oil passing through such annular space, down the stem 130, and through the openings 139 in the lower end of the sleeve to the atomizer 140. Injection air enters the inlet opening 141 above the cage and passes to the annular space between the intermediate sleeve 138 and the stationary sleeve structure 133 from which it passes to the atomizer. It will, therefore, be apparent that the fuel oil in passing through the atomizer will be thoroughly divided by the air and discharged into the combustion space of the engine cylinder in a finely divided state when the valve 131 is opened.

As the scavenge air valve 86 and the fuel valve structure are arranged at the top of the combustion space, it will be apparent that they are located adjacent to the region of highest temperature ranges in engine operation. Hence, in order to avoid possible cracking of oil immediately above the valve 131, I provide the stationary sleeve structure with suitable water-cooling means, water being supplied to the channel 145 of such sleeve passing to the bottom of the sleeve structure, around the valve structure, and then out of the passageway 146 to a suitable outlet not shown. Heat resistant packing 147 is interposed between the lower end of the stationary sleeve structure 133 and the hollow interior of the stem 87 of the scavenge air valve in order to effect a thorough seal between these parts.

From the foregoing, it will be apparent that my improved engine possesses several important advantages from the standpoints of removability of parts, cooling, resistance to working stresses, and capability of withstanding high temperatures.

Each cylinder and its valve cage may be placed in position or removed with respect to the tabular support by upward movement of the cylinder, it being necessary only to screw up or to take off the nuts 27. Each of the cages is readily removable from its cylinder.

Owing to the fact that each of the cylinders is imperforate from end to end, with the exception of the exhaust ports at the lower end, it is possible to provide a cooling jacket which envelops the cylinder, particularly the upper or combustion portion thereof, without the cooling space being interrupted by spacing or supporting webs, whereby the entire outer surface of the cylinder may be enveloped by cooling fluid. To this end, the ends of each cylinder have jacket members joined thereto and a third jacket member is connected to one of the first jacket members and has a telescopic fluid-tight fit with respect to the other jacket member, whereby the jacket construction will accommodate itself to the length of the cylinder. Cooling water is supplied near to the bottom of the jacket space, and then it passes upward as a continuous and uninterrupted annular sheet bathing the entire surface of the cylinder from a point well below the exhaust openings to a point well above the valve construction.

Each of the cylinders is provided with a piston bore portion and a contracted portion which has a convergent combustion space; and, above the combustion space, the contracted portion has an axial opening to receive a valve cage having all of the necessary valves. In other words, each cylinder is bottle-shaped, the cylindrical portion affording the piston bore, the flaring portion providing the convergent combustion space, and the neck portion having the valve mechanism therein. As the neck portion is imperforate from end to end, the cage is provided with the necessary valve-controlled passages for the admission of fluids to the cylinder. This results, not only in a cylinder construction which may be readily cast, but also one in which cooling to the best advantage where most required is obtained. Also, as there are no openings extending through the cylinder wall, the danger of heat cracks is avoided.

The upper jacket member is joined to the upper end of the neck portion, surrounds the latter, the flaring portion, and the upper end of the piston bore portion; and the lower end of such jacket member rests on and is secured to the horizontal support, as elsewhere more particularly herein set forth.

Owing to the fact that all admission of fluid takes place through the valve cage, it is possible to cast a cylinder with the terminal jackets as a symmetrical construction which has the advantage of greater uniformity of contraction and expansion and consequently the tendency to distortion or the development of internal stresses is reduced.

As each cylinder is supported by a member joined to the outer end of the neck portion, the working forces are applied directly through the upper jacket member to the supporting structure and the cylinder is relieved of axial stresses due to engine operation. By having the wall enclosing the combustion space flared, the unit stresses are reduced over what such stresses would be if the combustion was defined by a portion of the piston bore portion.

Air is supplied to each cage by a chamber which is clamped in place between a peripheral flange on the cage structure and the outer end of the cylinder structure, the cage having an inlet port communicating the with chamber.

It will be noted that each of the tabular supports 23 sustains the weight of a pair of cylinders, their jacket constructions, and the exhaust collectors therefor.

Furthermore, with my improved type of engine, the tension bolts 24 are adapted to resist working forces of the engine in order to avoid possible vibration and loosening of various engine parts. Also, the transverse bolts 9 below the crank shaft bearings and terminating outside of pairs of upright bolts 24 serve to reinforce the engine structure beneath the bearings. As hereinbefore pointed out, the bolts 24 extend from the bottom of the crank case beneath the crank shaft bearings and terminate at the top of the supporting member 23. The nuts 27 and 28 are screwed up on the bolt ends until the long bolts are placed in tension to an extent greater than the maximum stresses encountered in operation of the engine, whereby there will always be residual tension in the bolts tending to hold the parts of the engine firmly together. Also, the reaction of the crank shaft in its bearings is effectively resisted by the vertical rods or bolts 24 together with the transverse tension rods or bolts 9, the latter having their nuts 10 and 11 screwed up so as to place them under initial tension. It will, therefore, be apparent that the crank shaft bearings are supported not only by the casing structure but also by the vertical rods or bolts 24 and by the transverse rods or bolts 9. The transverse rods or bolts 9 resist deflection due to the reaction at the bearings incident to engine operation. The long rods 24 resist forces applied in opposed directions to the head ends of the cylinders and to the crank shaft bearings and the rods 10 resist deflection due to bearing reactions. Hence it will be seen that the framework of my engine acts as a spacing structure for various parts, such framework being subjected only to compression stresses, the working forces of the engine manifesting themselves as tension stresses which are resisted by the bolts 9 and 24. By the use of tension rod members made of high class materials and disposed in the advantageous manner herein disclosed, it will be apparent that the frame members and the casing structure may be made lighter, thereby effecting a considerable saving in weight of the engine.

The engine being in operation by fuel combustion, the cycle of the piston and the operation of the fuel inlet valve and the scavenging valve are as follows: Referring particularly to Fig. 4, the left-hand piston is shown in position at which its cylinder is about to receive, or is receiving the charge through the fuel inlet valve, and the right-hand piston is shown in the exhaust position, the scavenging valve of its cylinder being open to permit scavenging air to blow the products of combustion downward through the exhaust ducts 49ᵃ. When the piston is in the position shown in the left-hand cylinder in Fig. 4, the spring 118 exerts its force to maintain the scavenging valve 86 closed, and a cam 178 acts on the roller 177 and the intermediate connections to move the valve 163 to open position, permitting the fuel mixed with the atomized injection air to enter the cylinder space above the head of the piston. The fuel valve then closes and the heat in the cylinder ignites the fuel and causes the same to burn, thereby exerting its force to propel the piston toward the exhaust end of the cylinder. When the piston reaches the exhaust end of the cylinder, it clears the exhaust ducts 49ᵃ and permits the burned gases which are at 40 pounds pressure per square inch, or thereabouts, to pass through said ducts 49ᵃ to the exhaust chamber 54, and thence to the exhaust pipe 56, thus reducing the pressure within the engine cylinder to substantially atmospheric pressure. As soon as the cylinder pressure is thus lowered, the cam 116 acts on the roller 115 to thrust the scavenging valve 86 inward away from its seat, whereupon the compressed air in the chambers 75 rushes down past the scavenging valve and drives before it the column of spent gases remaining in the cylinder, these gases, together with the scavenging air, passing outward through the exhaust ducts 49ᵃ. Preferably the supply of scavenging air is such as to insure complete scavenging of the cylinder, and a little excess of scavenging air after the last of the burned gases has been expelled. The piston then starts upon its return stroke, and since it has covered the exhaust ports 49ᵃ to close the same, and preferably soon after such ports have been closed, the scavenging valve is permitted to close by the cam 116, and the cylinder charged with pure air is then compressed until the piston reaches the position shown in the left-hand cylinder in Fig. 4, whereupon, the inlet fuel valve 163 is again operated, as heretofore described.

The diameter of the opening 83 for the scavenging air, and the location of the scavenging valve is such that the scavenging air strikes the valve and is deflected in a hollow cone-like form into contact with the tapered portion 33 of the upper portion of the cylinder, so that the scavenging air not only is spread over the entire transverse area of the cylinder so as to completely scavenge the latter, but serves to cool the scavenging valve, and also by its contact with the cylinder walls to exert its cooling effect thereon.

What I claim and desire to secure by Letters Patent of the United States is:—

1. In an internal combustion engine, the combination of a cylinder structure having a piston bore portion and a laterally imperforate contracted portion extending to one end of the structure and single supporting means for the cylinder connected only to the contracted portion beyond the combustion space for supporting the engine cylinder and for resisting axial working forces, whereby the piston bore portion and the part of the contracted portion between the supporting means and the piston bore portion are free to expand and to contract relatively to the supporting means and whereby said portion and part are relieved of tension stresses due to axial working forces.

2. The combination, with an internal combustion engine cylinder structure including contracted neck and piston bore portions joined by a flaring portion, of cooling jacket means for the cylinder structure including a member joined to the neck portion beyond the junction of the latter with the flaring portion and constituting the sole supporting means for the cylinder structure.

3. The combination, with an internal combustion engine cylinder structure including contracted neck and piston bore portions joined by a flaring portion and the piston bore portion having exhaust port means extending through its wall near to the end thereof opposite to the neck and flaring portions, of cooling jacket means for the cylinder structure including a member joined to the outer end of the neck portion, whereby the cooling space extends beyond the combustion zone, and said member constituting the sole supporting means for the cylinder structure.

4. A one-piece, cast, cylinder construction comprising a piston bore portion, a converging portion defining a combustion space and joined to one end of the piston bore portion, an imperforate cylindrical wall portion joined to the converging portion and defining a space communicating with the combustion space for the reception of valve mechanism, an overhanging member joined to the outer end of the cylindrical wall portion and having outwardly extending circumferential flanges adjacent to the ends thereof together with strengthening webs joining the flanges and the overhanging member and extending substantially axially of the cylinder.

5. In an internal combustion engine, the combination of a cylinder structure having a piston bore portion and a contracted portion extending to the outer end of the structure and a supporting member overhanging the cylinder structure and joined to the outer end of the contracted portion for sustaining the weight of the cylinder structure and for resisting working forces, whereby the cylinder structure is free to expand and to contract with respect to the supported end and whereby it is relieved of axial working stresses, the surfaces of the cylinder structure and of the supporting member being surfaces of revolution about a single axis.

6. In an engine, the combination of a cylinder construction including piston bore and contracted portions and supporting-jacket-forming means connected to the contracted portion of the cylinder construction beyond its combustion space and defining, with respect to the construction, an uninterrupted annular cooling space extending beyond the combustion space, said means constituting the sole support for the cylinder construction, whereby the latter is free to expand and to contract and is relieved of axial working forces in service.

7. In an engine, the combination of a cylinder construction including piston bore and contracted portions, said contracted portion defining a convergent combustion space, a supporting jacket member connected to the contracted portion beyond the combustion space, and means cooperating with the supporting jacket member to define a cooling space with respect to the cylinder construction extending beyond the combustion space, said jacket member constituting the sole support for the cylinder construction, whereby the latter is free to expand and to contract and is relieved of axial working forces in service.

8. In an engine, the combination of a cylinder support having an opening therein, a cylinder construction extending through the opening and spaced from the wall of the latter and including piston bore and contracted portions, a jacket member connected to the support, extending outwardly from the latter and joined to the contracted portion of the cylinder construction beyond the combustion space of the latter, means extending through the opening and cooperating with said jacket member and with the cylinder construction to define an annular cooling space which extends beyond the combustion space.

9. In an engine, the combination of a support, a cylinder construction including piston bore and contracted portions and the contracted portion defining a convergent combustion space, and an overhanging jacket member having its outer end extending inwardly and forming an annular connection with the contracted portion beyond the combustion space and having its other end connected to the support and constituting the sole supporting means for the cylinder construction.

10. In an internal combustion engine, the combination of a horizontal tabular support having a vertical cylindrical opening therein, a vertical cylinder construction including piston bore and neck portions joined by a flaring portion, said piston bore portion extending through said opening and above and below the upper and the lower sides of said support, being spaced from the walls of the opening, and having exhaust ports below the support, an overhanging jacket member connected to the upper side of said support, the neck portion spaced outwardly from the junction of the neck and flaring portions, and means including a tubular member extending through said opening and cooperating with the jacket member the define a cooling space extending above the flaring portion.

11. In an internal combustion engine, the combination of a cylinder having a piston bore portion and a contracted imperforate tubular portion defining a convergent combustion space and defining a cylindrical space above the combustion space for the reception of a valve cage, a valve cage in said cylindrical space and having fluid passages having inlets beyond the outer end of the contracted portion and outlets for discharging into the convergent combustion space, means for supporting the cylinder connected to the contracted portion thereof, whereby the cylinder is free to expand and contract with respect to the point of support, a jacket construction for the cylinder including means whereby it may accommodate its length to that of the cylinder and including a member integral with the end of the piston bore portion remote from the contracted portion, an annular series of conduit members integral with the piston bore portion and with said jacket member and bridging the space therebetween to provide for the discharge of products of combustion from the cylinder.

12. In an internal combustion engine, the combination of a cylinder including a piston bore portion and a contracted imperforate tubular portion, the contracted portion defining a converging combustion space, means connected to the outer end of the contracted portion and constituting the sole support for the cylinder, whereby the opposite end of the piston bore portion is free to move incident to expansion and contraction of the cylinder, a valve cage fixed within the contracted portion, said cage having an opening substantially coaxial with the cylinder bore, said opening having an inlet beyond the outer end of the contracted portion and having at its outlet a conical seat whose direction of flare is substantially the same as that of the inner surface of the flaring portion of the contracted portion, a valve having a conical portion cooperating with said seat and the valve and the seat cooperating to direct air passing through said opening into contact with the surface of said flaring portion, and a circumferential series of exhaust openings at the other end of the cylinder.

13. In an engine, the combination of a one-piece, bottle-shaped cylinder, jacket members connected to the ends of the cylinder and extending toward each other, a jacket member bridging the space between the first jacket members, and cylinder supporting means carried by the jacket member which is connected to the neck portion of the cylinder.

14. In an internal combustion engine, the combination of a cylinder construction comprising a one-piece cylinder member having sleeve members joined to the ends of the latter, surrounding the cylinder member, spaced therefrom, and extending toward each other, and a jacket member secured in place with respect to one sleeve member and having a fluid-tight sliding fit with respect to the other sleeve member.

15. In an internal combustion engine, the combination of a support, a bottle-shaped cylinder including neck and cylindrical bore portions joined by a flaring portion, said flaring portion defining a converging combustion space and the neck portion being constituted by an imperforate sleeve-like member, a jacket member connected to the support and to the outer end of the neck portion beyond the combustion space for supporting the cylinder, whereby the latter is free to expand and contract with respect to the point of support and whereby the cylinder is relieved of axial working stresses, and means separate from the support and cooperating with said jacket member to constitute a cooling jacket for the cylinder.

16. In an internal combustion engine, the combination with a cylinder support, a cylinder, a jacket member joined to the combustion end of the cylinder, surrounding a portion of the latter, and connected to the support, a jacket member joined to the other end of the cylinder and surrounding a portion of the latter adjacent to that end, and a third jacket member connected to the first jacket member and having a telescopic fit with respect to the second jacket member.

17. In an internal combustion engine the combination of a cylinder, an outer wall integral with one end of the cylinder, an outer wall integral with the other end of the cylinder, said walls being spaced from the cylinder, a jacket member secured rigidly in place with respect to one of said walls and telescoping the other wall to bridge the space between the said outer walls and constituting therewith a cooling jacket, and means for supporting said cylinder at one end whereby it is free to expand and contract at the other end.

18. In an internal combustion engine, the combination of a cylinder support having an opening, a cylinder extending through the opening, an annular overhanging wall having one terminus fixed to the combustion end of the cylinder and having its other terminus fixed to the support and cooperating with the cylinder to define a cooling space for the latter, a wall member connected to the other end of the cylinder and defining a cooling space with respect thereto, and a tubular jacket member arranged within the opening in the support and bridging the space between said overhanging wall and said second wall.

19. In an internal combustion engine, the combination of a cylinder support having an opening, a cylinder extending through the opening, a jacket member having its outer terminus fixed to the combustion end of the cylinder and having a peripheral flange at its inner terminus fixed in position with respect to the support and constituting the sole supporting means for the cylinder, a jacket member joined to the other end of the cylinder and surrounding a portion of the cylinder at that end, and a third jacket member extending through the opening and having at one end a peripheral flange disposed between the peripheral flange of the first jacket member and the support and having its other end telescopically engaging the second jacket member.

20. In an internal combustion engine, the combination of a cylinder construction comprised by piston bore and neck portions joined by a conical portion, said neck portion being constituted by a cylindrical wall which is imperforate throughout its length and which defines an axial opening for the reception of valve mechanism, a conical sleeve for supporting the cylinder construction, joined to the outer end of the neck portion and spaced from the latter and from the conical portion, a second sleeve member carried by and joined to the end of the piston bore portion opposite to the conical portion, said second sleeve member surrounding and being spaced from the piston bore portion, and a third sleeve member connected to the conical sleeve member and having a telescopic fluid-tight fit with respect to the second sleeve member.

21. In an internal combustion engine, the combination of a bottle-shaped cylinder construction comprising piston bore and neck portions connected by a flaring portion, the neck portion consisting of an imperforate cylindrical wall which defines an opening disposed axially of the construction for the reception of a valve cage, a sleeve member for supporting the cylinder construction joined to the outer end of the neck portion and surrounding the latter and the flaring portion and spaced therefrom to define a cooling space, and a valve cage in the axial opening of said neck portion, said cage provided with fluid passage means having inlets arranged above the outer end of said neck portion, extending through the portion of the cage within the neck portion, and having outlets at the lower end thereof for the discharge of fluids into the flaring portion.

22. In an internal combustion engine, the combination of a cylinder construction comprising a piston bore portion and a neck portion joined by a flaring portion, said neck portion being imperforate throughout its length and having an axial opening for the reception of valve mechanism, a valve cage in said opening and having fluid passages provided with inlets beyond the outer end of the neck portion and with outlets at the lower end thereof arranged to discharge into said flaring portion, a sleeve member joined to the outer end of the neck portion and surrounding and spaced from the neck and flaring portions and provided with means for supporting the cylinder construction, a sleeve member joined to the other end of the piston bore portion and surrounding and being spaced from the piston bore portion adjacent that end, and a jacket member having one end secured in place with respect to the first sleeve member and having a telescopic fluid-tight fit with respect to the second sleeve member.

23. In an internal combustion engine, the combination of a one-piece, cast, cylinder construction having overhanging sleeve members joined to the ends thereof and extending toward each other, a jacket member having one end secured in place with respect to one sleeve member and having its other end telescopically engaging the other sleeve member with a fluid-tight fit, and conduit means joined to the cylinder construction and to said last-named sleeve member and bridging the space therebetween to provide for the exhaust of products of combustion from the cylinder construction.

24. In an internal combustion engine, the combination of a cylinder support, a cylinder connected at its explosion end to said support and having its other end free to move to provide for longitudinal contraction and expansion of the cylinder, a sleeve member connected to the other end of the cylinder and surrounding and spaced from the portion of the cylinder adjacent to that end, a jacket member secured in place at one end with respect to the cylinder at the explosion end of the latter and having a telescopic fit with respect to said sleeve member at its other end, conduit means joining the cylinder and the sleeve member and bridging the space therebetween to provide for the exhaust of products of combustion from the cylinder, and an exhaust collector surrounding and slidably engaging said sleeve and having communication with said conduit means.

25. In an internal combustion engine, the combination of a cylinder support, a one-piece cylinder construction connected at one end to the support and free to expand and contract lengthwise with respect to the point of support, exhaust ports near the other end of the cylinder construction, and an exhaust collector having walls which engage the cylinder construction at opposite sides of the exhaust ports and which define a substantially annular exhaust collection chamber.

26. In an internal combustion engine, the combination of a horizontal support for a cylinder, a vertical one-piece cylinder construction connected at one end to said support and free to expand and contract lengthwise with respect to the point of support, exhaust ports near the other end of the cylinder construction, and an exhaust collector suspended from the lower side of the support and having walls which slidably engage the cylinder construction above and below the exhaust ports to define a substantially annular exhaust collection chamber.

27. In an internal combustion engine, the combination of a cylinder support, a cylinder connected at its explosion end to said support, and free to expand and contract relative to the support, an external wall integral with the lower end of the cylinder and surrounding the latter, a member with which said wall cooperates to provide a space for cooling medium, conduit means integral with the cylinder and with said wall, bridging the space therebetween, and communicating interiorly with the cylinder and exteriorly of the wall to provide for the egress of products of combustion from the cylinder, an exhaust collector surrounding said wall and having communication with said conduit means and slidably engaged by said wall.

28. In an internal combustion engine, the combination of a crank shaft casing, a frame supported on the casing, a cylinder support on the frame, a cylinder, means for connecting the cylinder to the support, and tension members connecting the cylinder support with the crank shaft casing.

29. In an internal combustion engine, the combination of a crank-shaft casing, a frame supported on the casing, a cylinder support on the frame, a cylinder, tension means connecting the cylinder to the support, and tension members connecting the cylinder support with the crank-shaft casing, said tension members being normally under an initial tension in excess of the stress resulting from fuel combustion in the cylinder.

30. In an internal combustion engine, the combination of a bed, a frame, a cylinder support on the frame, a cylinder, a member having a wall defining a surface of revolution which is spaced from the cylinder to define a cooling space, means for connecting the cylinder to said member, means for connecting the member to the cylinder support, and tension means for connecting the bed, frame, and cylinder support.

31. In an internal combustion engine, the combination of a bed, standards on the bed, lateral braces connecting the standards, spacers on the upper portion of the standards, a cylinder support on the spacers, tension members connecting said bed, standards, spacers and cylinder support, and a cylinder supported at its head on said cylinder support and free to expand and contract longitudinally with reference to the cylinder support.

32. In an internal combustion engine, the combination of a bed, standards on the bed, lateral braces connecting the standards, spacers on the upper portion of the standards, a cylinder support on the standards, tension members connecting said bed, standards, spacers and cylinder support, and a cylinder extending through an opening in the cylinder support and having an overhanging external flange connected by tension devices to said cylinder support.

33. In an internal combustion engine, the combination of a bed, groups of standards on the bed, spacers on the upper portions of the said standards, cylinder supports on the spacers, means connecting the spacers of adjacent groups, tension members connecting said bed, standards, spacers and cylinder supports, and cylinders supported at their heads on said cylinder supports and free to expand and contract longitudinally with reference to the cylinder supports.

34. In an internal combustion engine, the combination of a bed, groups of standards on the bed, spacers on the upper portions of the said standards, cylinder supports on the spacers, web members connecting the spacers of adjacent groups, tension members connecting said bed, standards, spacers and cylinder supports, and cylinders supported at their heads on said cylinder supports and free to expand and contract longitudinally with reference to the cylinder supports.

35. In an internal combustion engine, the combination of a bed, groups of standards on the bed, pedestals on the upper portions of the said standards, cylinder supports on the pedestals, web members connecting the pedestals of adjacent groups, tension members connecting said bed, standards, pedestals and cylinder supports, and cylinders supported at their heads on said cylinder supports and free to expand and contract longitudinally with reference to the cylinder supports.

36. In an internal combustion engine, the combination of a bottle-shaped cylinder having neck, flaring, and cylindrical bore portions, a cylinder support, a supporting member connected to the outer end of the neck portion, tension means for holding the supporting member to the cylinder support, a valve cage fitting in the neck and having a flange at its outer end, and tension means of less total strength than the first tension means for holding the cage in place with respect to the cylinder.

37. In an internal combustion engine, the combination of a cylinder having a contracted combustion space at the outer end of the piston bore and communicating with an axially-disposed valve-cage-receiving opening, supporting means connected to the outer end of the cylinder, a cylinder support, tension bolts for connecting the supporting means to the cylinder support, a valve cage in said opening, and tension bolts of less total cross-sectional area than the first bolts for securing the cage in position with respect to the cylinder.

38. In an engine, the combination of a cylinder having an opening to receive valve mechanism in the head thereof, a valve cage in the opening, a fluid supply chamber surrounding the cage, a flange carried by the cage, and means for clamping the chamber between the flange and the head of the cylinder.

39. In an engine, the combination of frame members, pedestals carried by the frame members, a cylinder support carried by the pedestals and having an opening for a cylinder, a cylinder in the opening, supporting means connected to upper side of said support and joined to the upper end of the cylinder, exhaust ports extending through the cylinder wall and disposed below the lower side of said support, and an exhaust collector communicating with the exhaust ports and connected directly to the lower side of said support between the latter and the frame members and in the space defined by the pedestals.

40. In an internal combustion engine, the combination of a cylinder support having a plurality of openings therein for cylinders, cylinders in the openings and connected to one side of the support, exhaust means for the cylinders at the other side of the support, and exhaust collecting apparatus carried directly by the latter side of said support and communicating with the exhaust means of the cylinders.

41. In an internal combustion engine, the combination of a cylinder support having a plurality of openings therein for cylinders, cylinders in the openings, exhaust means for the cylinders below the support, and substantially annular exhaust collecting chambers surrounding the cylinders, communicating with said exhaust means, and carried directly by said support.

42. In an internal combustion engine, the combination of a horizontal support for a cylinder, and having an opening for a cylinder, a jacketed vertical cylinder in the opening, flanged supporting means connected to the cylinder and resting on the upper side of the support, exhaust ports for the cylinder arranged near the end of the latter opposite to the end connected to the flanged supporting means and extending across the jacket space, and exhaust collecting means surrounding the jacketed cylinder, communicating with said exhaust means, and carried by the lower side of the support.

43. In an internal combustion engine, the combination of a cylinder, crank shaft bearings, spacing means between the outer end of the cylinder and the crank shaft bearings, and tension means cooperating with the spacing means adjacent to the outer end of the cylinder and below the bearings to hold the intervening structure under compression to resist working forces of the engine.

44. In an internal combustion engine, the combination of crank shaft bearings, a cylinder, a cylinder support, a frame intermediate said support and said bearings, means for fastening the cylinder to the support, tension members connecting said support to said bearings, and means to tension said members uniformly throughout substantially their entire length.

45. In an internal combustion engine, the combination of engine supporting means including a crank shaft casing, an engine cylinder, a support for the cylinder, a frame between the engine supporting means and the cylinder support, means for connecting the cylinder to its support, bearing supports extending transversely of the crank shaft casing, crank shaft bearings carried by the bearing supports, tension rods extending through the cylinder and bearing supports and arranged at each side of the axis of the bearings, and means cooperating with the ends of the rods above the cylinder support and below the bearing supports and the crank shaft casing to place the rods under initial tension in order to clamp the intervening structure together under compression during engine operation.

46. In an internal combustion engine, the combination of an engine support, an engine cylinder, crank shaft bearings, means for spacing the outer end of the cylinder and the bearings from the support and for spacing the bearings from the outer end of the cylinder, and tension rods passing through the spacing means and terminating in the zone of the outer end portion of the cylinder and below the bearings to hold the intervening structure together under compression for resisting working forces of the engine.

47. In an internal combustion engine structure, the combination of a horizontal cylinder support, a vertical cylinder connected to the support at a plane between the upper and lower ends of the cylinder, crank shaft bearings, means for spacing the bearings from the support, tension rods terminating above the support and below the bearings and disposed on each side of the axis of the latter, and means cooperating with the ends of the rods and accessible externally of the engine structure to place the rods under initial tension in order to maintain the support, spacing means, and bearings clamped together under compression during engine operation.

48. In an internal combustion engine, the combination of a horizontal support, a vertical cylinder connected to the support, crank shaft bearings, supports for the crank shaft bearings extending transversely of the latter, means for spacing the cylinder and cylinder support from the bearings and their supports, means for reinforcing the bearing supports below the bearings, tension rods disposed at each side of the axis of the crank shaft bearings and extending above the upper side of the cylinder support and below the bearing supports, and means cooperating with the ends of the rods to place the latter under initial tension in order to maintain the cylinder support, spacing means, and bearing supports clamped together under compression during engine operation.

49. In an internal combustion engine, the combination of a support, a cylinder, crank shaft bearings, means for spacing the cylinder and the bearings from the support and for spacing the bearings from the cylinder, means for securing the cylinder to the spacing means, tension rods extending through the spacing means at the side of the bearings opposite to the cylinder and transversely with respect to the cylinder axis, means cooperating with the ends of said rods whereby the latter may be placed in tension to reinforce the spacing means below the bearings, tension rods disposed laterally of the bearings, extending parallel to the cylinder axis and through the spacing means, and terminating adjacent to the connection of the cylinder and the spacing means and below the first tension rods and inside of the ends of the latter, and means cooperating with the ends of the second tension rods whereby the intervening engine structure may be held together under compression to resist working forces of the engine.

50. In an engine structure, the combination of a horizontal support, a horizontal cylinder support, frame members between the cylinder support and the first support, crank shaft bearings, means for spacing the crank shaft bearings from the frame members, vertical rods passing through the cylinder support and the spacing means, and means cooperating with the ends of the vertical rods below the spacing means and above the cylinder support for placing the rods in tension, opposed frame members diverging downwardly to afford lateral support to the engine structure.

51. In an internal combustion engine, the combination of a cylinder support, a cylinder connected to the support and having means for admitting combustible constituents and scavenging air thereto, an external wall joined to one end of the cylinder and surrounding and spaced from the cylinder, means slidably engaging said wall and cooperating with the latter to provide a space about the cylinder for cooling fluid, a circumferentially-extending belt of separated and radially-disposed conduit members integral with the cylinder and with said wall bridging the space therebetween, and communicating interiorly of the cylinder and externally of the wall to provide for egress of products of combustion from the cylinder, said conduit members being disposed intermediate the ends of the cylinder so as to divide the cooling space into annular portions at both sides of the belt and the spaces between the conduit members providing for communication between said annular portions of the cooling space, whereby cooling fluid may freely pass from end to end of the cooling space and whereby the conduit members are enveloped by the cooling fluid, and an exhaust collector cooperating with said wall to receive products of combustion from the conduit members.

52. In an internal combustion engine, the combination of a horizontal cylinder support, a vertical cylinder connected to the support and having means for admitting combustible constituents and scavenging air to one end thereof, an external wall joined to the end of the cylinder opposite to the combustion end and surrounding and spaced from the cylinder, means slidably engaging said wall and cooperating with the latter to provide a space about the cylinder for cooling fluid, a circumferentially-extending belt of separated and radially-disposed conduit members integral with the cylinder and with said wall, bridging the space therebetween, and communicating interiorly of the cylinder and externally of the wall to provide for egress of products of combustion from the cylinder, said conduit members being elongated transversely in the direction of length of the cylinder, being inclined downwardly and outwardly from the cylinder, and being disposed intermediate the ends of the cylinder so as to divide the cooling space into annular portions at both sides of the belt and the spaces between the conduit members providing for communication between said annular portions of the cooling space, whereby cooling fluid may freely pass from end to end of the cooling space and whereby the conduit members are enveloped by the cooling fluid, and an exhaust collector cooperating with said wall to receive products of combustion from the conduit members.

53. In an internal combustion engine, the combination of a horizontal cylinder support, a vertical cylinder connected to the support and having means for admitting combustible constituents and scavenging air thereto, an external wall joined to the lower end of the cylinder and spaced from the latter, a tubular member slidably engaging the exterior of said wall and cooperating with the latter to define a space about the cylinder for cooling fluid, a circumferentially-extending belt of separated and radially-disposed conduit members integral with the cylinder and with said wall, bridging the space therebetween, and communicating interiorly of the cylinder and externally of the wall to provide for egress of products of combustion from the cylinder, said belt of conduit members being located above the lower end of the cylinder so as to divide the cooling space into annular portions at both sides of the belt and the spaces between the conduit members providing for communication between said annular portions of the cooling space, whereby cooling fluid may freely pass from end to end of the cooling space and whereby the conduit members are enveloped by the cooling fluid, and an exhaust collector cooperating with said wall to receive products of combustion from the conduit members.

In testimony whereof I have hereunto signed my name.

ARTHUR JACKSON WEST.